US009933547B2

(12) United States Patent
Macquin et al.

(10) Patent No.: US 9,933,547 B2
(45) Date of Patent: Apr. 3, 2018

(54) DEVICE FOR LOW CONTACT CABLE CLEANING

(71) Applicant: CGG Services SA, Massy (FR)

(72) Inventors: Raphaël Macquin, Montrouge (FR); André Séveno, Pluneret (FR); Jean-Baptiste Hubert, Quimper (FR); Frank Mclemore, Stafford, TX (US); Jérôme Deschamp, Gelos (FR)

(73) Assignee: CGG SERVICES SAS, Massy (FR)

( * ) Notice: Subject to any disclaimer, the term of this patent is extended or adjusted under 35 U.S.C. 154(b) by 0 days.

(21) Appl. No.: 14/438,018

(22) PCT Filed: Sep. 22, 2014

(86) PCT No.: PCT/EP2014/070097
§ 371 (c)(1),
(2) Date: Apr. 23, 2015

(87) PCT Pub. No.: WO2015/044074
PCT Pub. Date: Apr. 2, 2015

(65) Prior Publication Data
US 2015/0285949 A1 Oct. 8, 2015

Related U.S. Application Data

(60) Provisional application No. 61/911,830, filed on Dec. 4, 2013, provisional application No. 61/882,638, filed on Sep. 26, 2013.

(51) Int. Cl.
| B08B 1/04 | (2006.01) |
| G01V 13/00 | (2006.01) |
| B08B 1/00 | (2006.01) |
| B08B 9/023 | (2006.01) |

(52) U.S. Cl.
CPC .............. *G01V 13/00* (2013.01); *B08B 1/008* (2013.01); *B08B 1/04* (2013.01); *B08B 9/023* (2013.01)

(58) Field of Classification Search
CPC ........ G01V 13/00; B08B 9/023; B08B 1/008; B08B 1/04; F16B 2/10; H02G 7/16; B60L 5/02; B60M 1/28
USPC ..... 15/256.52, 256.53, 256.6, 104.04, 220.4, 15/88; 241/36, 283, 24, 1, 301
See application file for complete search history.

(56) References Cited

U.S. PATENT DOCUMENTS

| 3,999,240 | A | * | 12/1976 | Uchida | ................... | B65H 75/44 |
| | | | | | | 15/104.04 |
| 4,095,555 | A | * | 6/1978 | Kmetz | ..................... | B05C 1/022 |
| | | | | | | 118/208 |
| 4,290,123 | A | * | 9/1981 | Pickens | ................... | G01V 13/00 |
| | | | | | | 367/13 |

(Continued)

OTHER PUBLICATIONS

International Search Report and Written Opinion dated Mar. 2, 2015 in related International Application No. PCT/EP2014/070097.

(Continued)

*Primary Examiner* — Katelyn B Whatley
(74) *Attorney, Agent, or Firm* — Patent Portfolio Builders PLLC

(57) ABSTRACT

A method and cable cleaning device that includes a housing and at least one cleaning element attached to the housing. The cleaning element is configured to clean marine fouling from a cable. The cleaning element is at least partially rolled around the cable and its tautness is adjustable.

13 Claims, 14 Drawing Sheets

(56) References Cited

U.S. PATENT DOCUMENTS

| | | | | |
|---|---|---|---|---|
| 4,543,683 | A * | 10/1985 | Goldman | B63B 59/00 15/104.04 |
| 4,625,355 | A * | 12/1986 | Miyashita | B23K 3/028 15/104.04 |
| 6,193,809 | B1 * | 2/2001 | Hudson | B08B 1/008 114/111 |
| 6,432,213 | B2 * | 8/2002 | Wang | 134/6 |
| 6,702,026 | B2 * | 3/2004 | Allen | B63B 21/502 114/243 |
| 6,990,707 | B1 * | 1/2006 | Heumann | B08B 1/008 118/208 |
| 2006/0123571 | A1 | 6/2006 | Sotirakos et al. | |
| 2007/0033763 | A1 | 2/2007 | Steinch | |
| 2008/0135232 | A1 | 6/2008 | Lawler et al. | |
| 2009/0044369 | A1 * | 2/2009 | Heumann | B08B 9/023 15/302 |
| 2010/0226724 | A1 * | 9/2010 | Doleshal | E02B 17/0034 405/211 |
| 2012/0006554 | A1 * | 1/2012 | Allen | B08B 1/008 166/338 |
| 2012/0275275 | A1 * | 11/2012 | Tonchia | B08B 1/04 367/153 |
| 2013/0098394 | A1 | 4/2013 | Fleischer-Pedersen | |
| 2014/0254311 | A1 * | 9/2014 | Macquin | G01V 13/00 367/15 |
| 2014/0338699 | A1 * | 11/2014 | Bassett | G01V 13/00 134/6 |
| 2015/0013719 | A1 * | 1/2015 | Macquin | G01V 13/00 134/6 |

OTHER PUBLICATIONS

Office Action in related European Application No. 14 776 610.9 dated Oct. 6, 2016. (All referrences were previously submitted in an Information Disclosure Statement dated Apr. 23, 2016.).

* cited by examiner

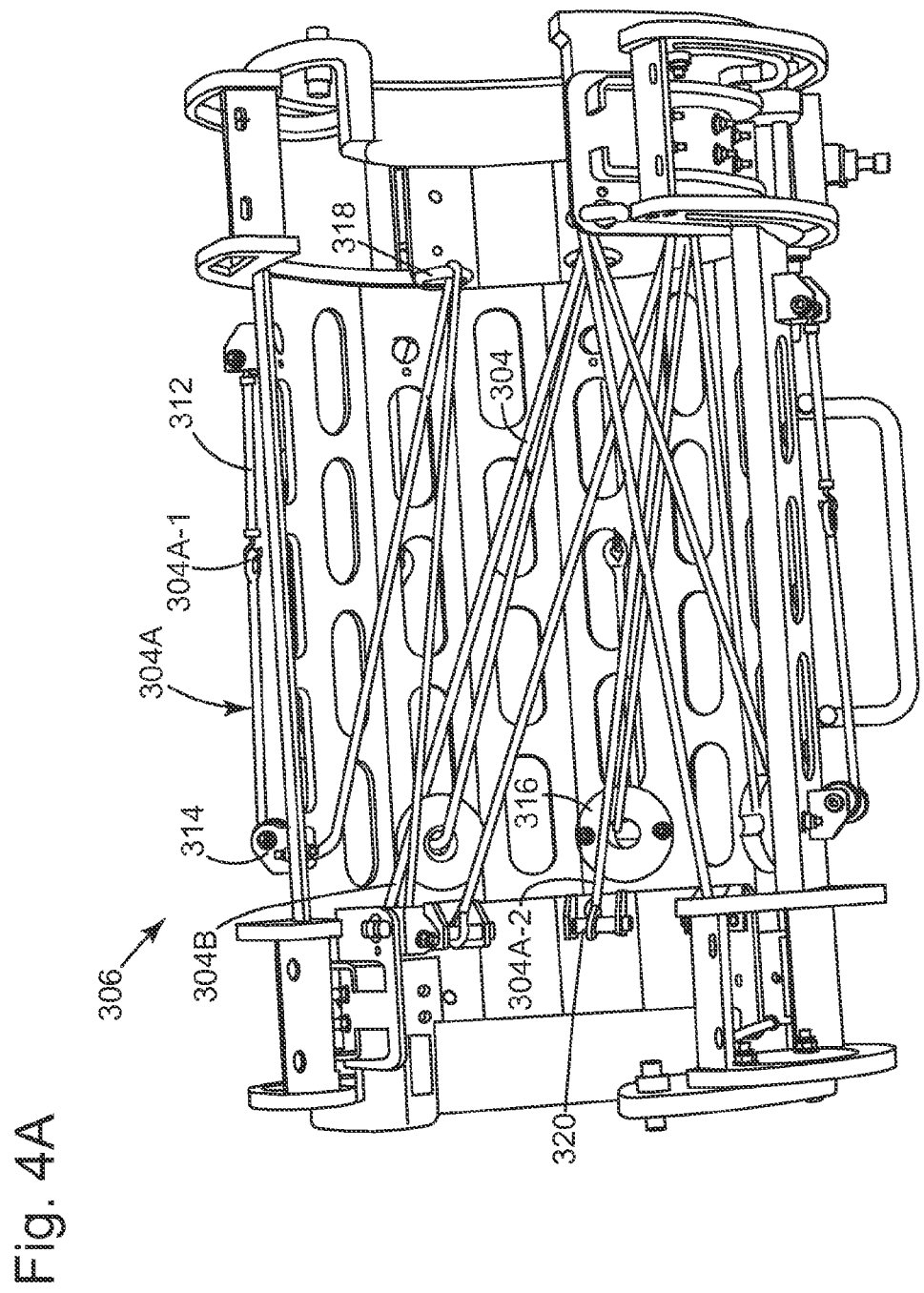

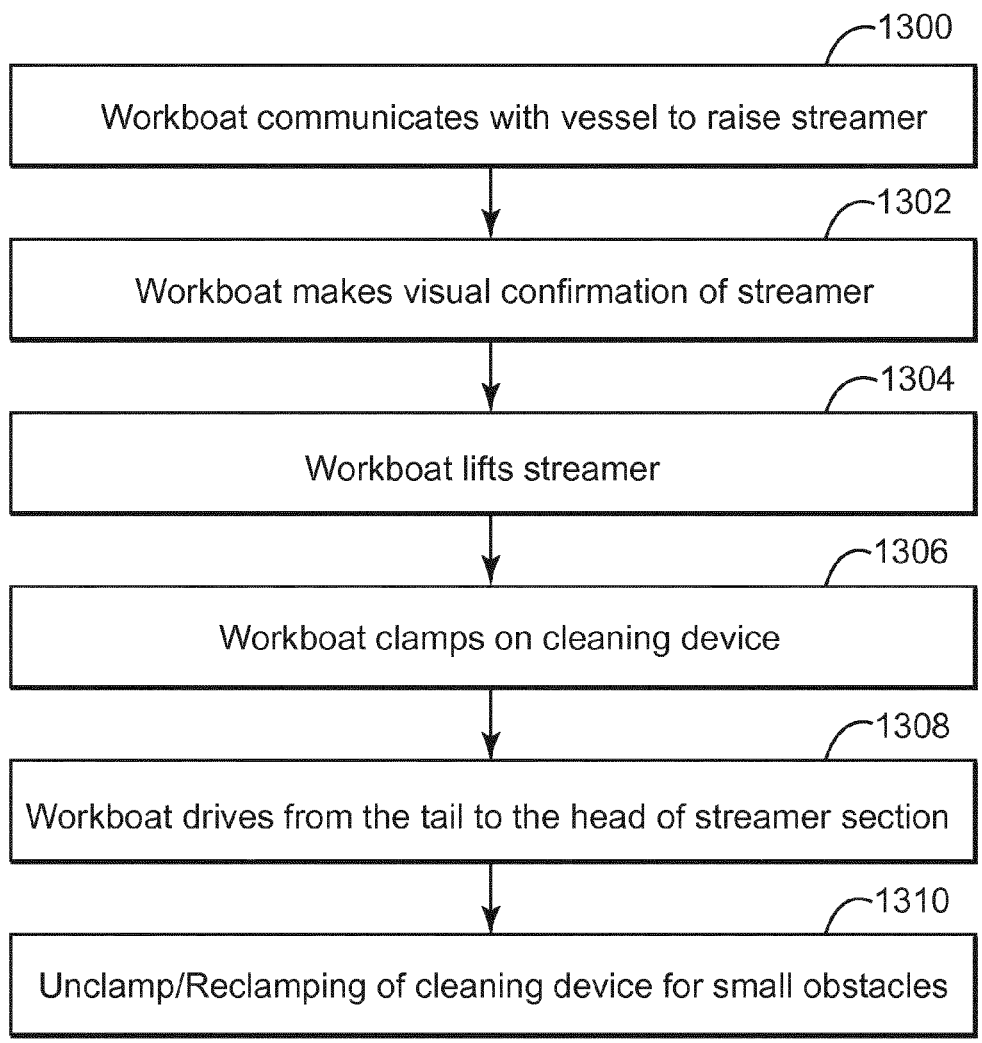

DEVICE FOR LOW CONTACT CABLE CLEANING

RELATED APPLICATIONS

This application is the National Stage of International Application No. PCT/EP2014/070097 filed on Sep. 22, 2014, which claims priority and benefit from U.S. Provisional Patent Application Ser. No. 61/911,830, filed Dec. 4, 2013, for "High Efficiency Workboat Cleaning System" and to U.S. Provisional Patent Application Ser. No. 61/882,638, filed Sep. 26, 2013, for "Low Contacts Streamer Cleaning Devices and Methods," the entire contents of which are expressly incorporated herein by reference.

TECHNICAL FIELD

Embodiments of the subject matter disclosed herein generally relate to cleaning devices for cables and other structures used in marine seismic surveying.

BACKGROUND

During the past years, offshore drilling has continually increased. Given high costs and risks associated with offshore drilling, to avoid a dry well, marine seismic surveys are used to generate a profile (image) of the geophysical structure under the seafloor. While this profile does not necessarily provide an accurate location for the oil and gas, it suggests, to those trained in the field, the presence or absence of oil and/or gas.

A typical marine seismic surveying system is illustrated in FIG. 1. A vessel 100 tows a seismic source 102 and plural streamers 106, each streamer carrying an array of seismic receivers 104 (e.g., hydrophones). It is desirable to maintain the streamers at predetermined horizontal cross-line distances (i.e., along an axis perpendicular to the towing direction T), and at predetermined depths (e.g., 10 m) relative to the water surface 108. The seismic source 102 is configured to generate a seismic wave 110 that propagates downward (down, up and vertical being defined relative to gravity) toward the seafloor 120 and penetrates formations 125 under seafloor 120 until it is eventually reflected at discontinuity locations such as 122a and 122b. The reflected seismic waves 130a and 130b propagate upwardly and can be detected by one of receivers 104 on streamer 106. Based on the data collected by receivers 104, an image of the subsurface formation is generated by further analyses of the collected data.

To maintain the streamers at a desired position (i.e., such as to have predetermined cross-line distances and predetermined depths), conventionally, a head float 140 and a tail buoy 150 are attached to the ends of the streamer. Position control devices 160 (e.g., birds) may be attached to streamer, every 300 m, to control a position of the streamer.

Marine surveys often last for weeks or months, which is more than enough time for the survey cables to attract barnacles and other unwanted wildlife or debris. Such materials, when attached to the streamer, tend to increase drag on the cables, thereby requiring a greater amount of towing energy and placing increased strain on the ship, the cables, and the positioning devices. Such materials can also induce additional turbulence, which may impair the quality of the data acquired from the sensors distributed along the cable. Current methods of cleaning survey streamer cables tend to be time consuming, labor intensive, and generate premature worn to the streamer cables and its measuring instruments, as now discussed.

A conventional tool and method for cleaning survey cables is described in U.S. Patent Publication No. 2013/0098394 A1 (herein, '394 application), the entire content of which is incorporated herein by reference. The '394 application discloses, as illustrated in FIG. 2 (which corresponds to FIG. 3A in '394 application), a cleaning tool for cleaning a survey cable 202. This cleaning tool employs a cable guide 205 with a roller mechanism 206 that lifts the survey cable clear of the water and guides it through a scraper mechanism 211. As the cable guide 205 lifts and passes along underneath the survey cable, the cable exerts a frictional pull on the roller mechanism 206, causing it to turn at a rate that matches the speed of the cable relative to the workboat. The roller mechanism 206 is coupled via a belt drive system 204 to rotate a set of scraper wheels 210. The scraper wheels 210 have short bristles of plastic, wire, or some other material selected for its effectiveness at removing barnacles. These scraper wheels cause wear to the survey cable's surface due to their abrasive manner of removing the barnacles.

Due to the scraper wheels' abrasive approach in removing marine fouling, the streamer jacket becomes rough with the premature wear, which enables barnacles to settle more easily and at a quicker rate. This then creates an undesirable situation where the more one cleans the streamer, the faster the barnacles can return.

Further, due to the nature of the cleaning tool employed in FIG. 2, the belt drive system 204 is susceptible to erroneous behavior due to excess barnacle build-up. Any debris or marine contaminant that may enter inside the belt drive system, the roller mechanism 206, or the springs 216, used in this embodiment, would render the device inoperable.

There is, therefore, a need to develop non-destructive methods of cleaning to eliminate premature wear and mechanical parts that are prone to failure.

SUMMARY

According to an embodiment, there is a cable cleaning device that includes a housing and at least one cleaning element attached to the housing and configured to clean marine fouling from a cable. The cleaning element is at least partially rolled around the cable and its tautness is adjustable.

According to another embodiment, there is a marine seismic acquisition system that includes a cable and a cable cleaning device. The cable cleaning device includes a housing and at least one cleaning element attached to the housing and it is configured to clean marine fouling from the cable. The cleaning element is at least partially rolled around the cable and its tautness is adjustable, and at least one pair of high pressure nozzles configured in opposite directions to clean the cable.

According to still another embodiment, there is a method for cleaning a marine cable while being towed. The method includes a step of mounting a cleaning device on the cable and a step of cleaning the cable using an adjustable cleaning element located in the cleaning device. The adjustable cleaning element is made taut when in contact with the cable.

BRIEF DESCRIPTION OF THE DRAWINGS

The accompanying drawings illustrate various possible embodiments, wherein:

FIG. 4A is an inside view of a cleaning device according to an embodiment;

FIG. 13 shows a flowchart of a method according to an embodiment.

DETAILED DESCRIPTION

Figure 1:
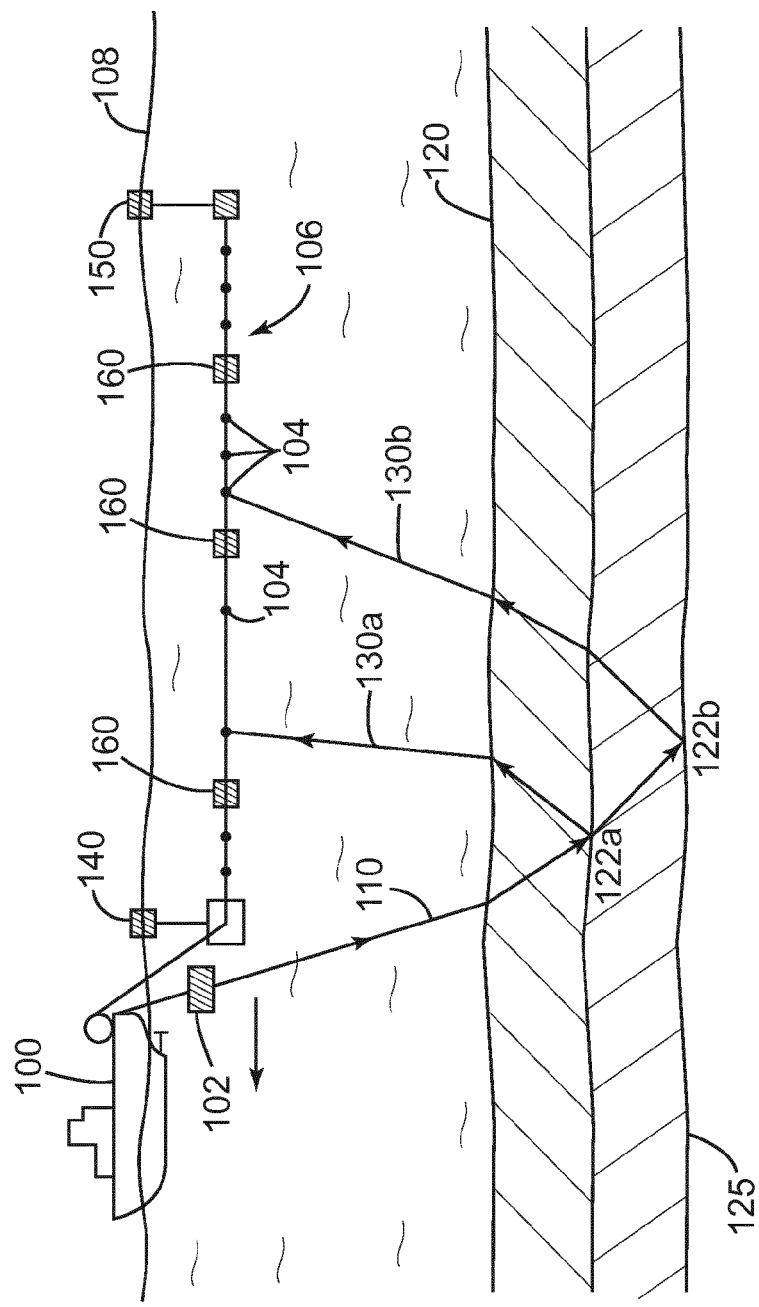
FIG. 1 is a schematic diagram of a seismic survey system.
Figure 2:
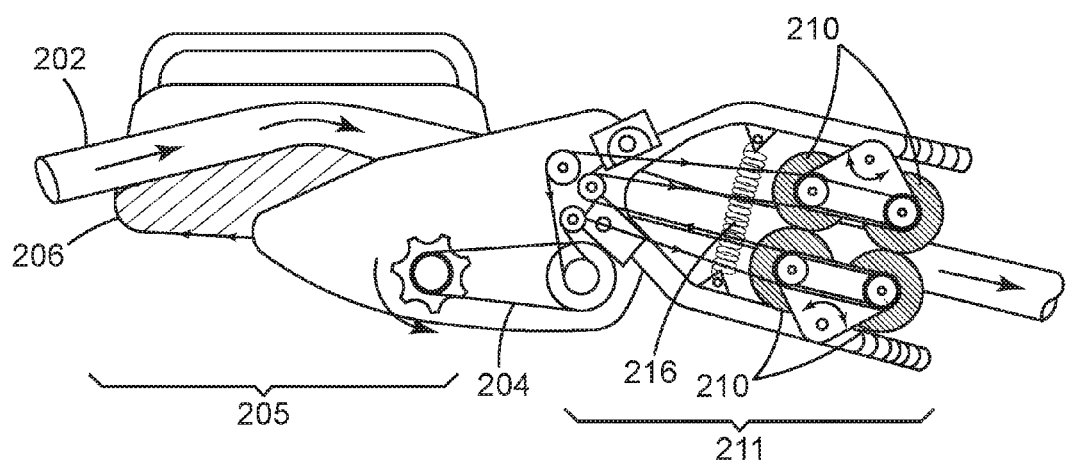
FIG. 2 illustrates a side view of a survey cable cleaning tool embodiment.

The embodiments are described more fully hereinafter with reference to the accompanying drawings, in which embodiments of the inventive concept are shown. In the drawings, the size and relative sizes of layers and regions may be exaggerated for clarity. Like numbers refer to like elements throughout. The embodiments may, however, be embodied in many different forms and should not be construed as limited to the embodiments set forth herein. Rather, these embodiments are provided so that this disclosure will convey the scope of the inventive concept to those skilled in the art. The scope of the embodiments is therefore defined by the appended claims.

Reference throughout the specification to "one embodiment" or "an embodiment" means that a particular feature, structure, or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular feature, structures, or characteristics may be combined in any suitable manner in one or more embodiments.

According to embodiments, among other things, it is desirable to address the fouling problem related to cables used in marine seismic exploration as discussed in the Background. The following embodiments describe devices and methods which can use a soft element or high pressure nozzles or a combination of both soft element and high pressure nozzles to clean marine fouling on marine seismic streamers. Note, as used herein, soft element is intended to include one or more soft elements.

Figure 3:
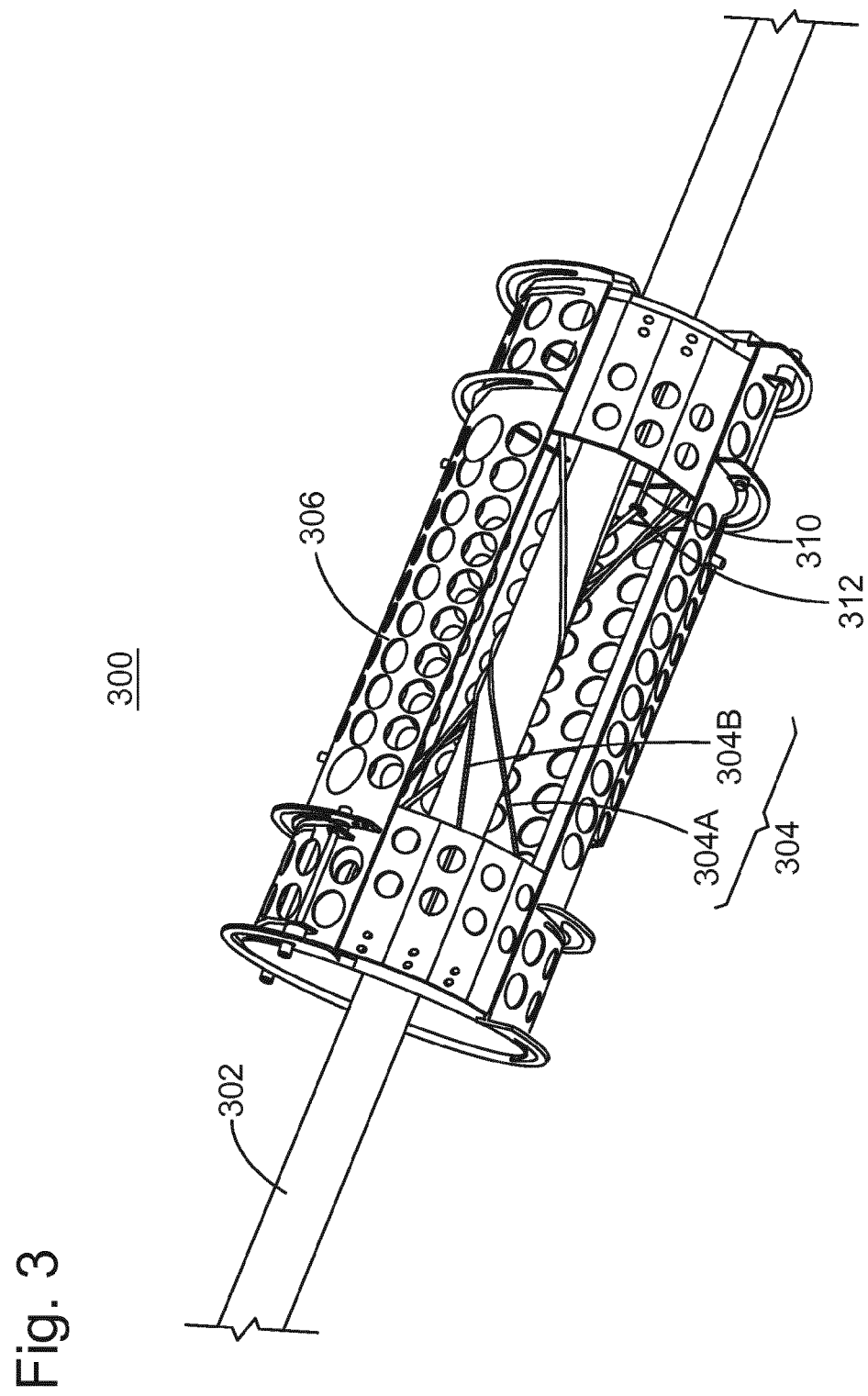
FIG. 3 illustrates a cleaning device with soft element according to an embodiment.
Figure 4B:
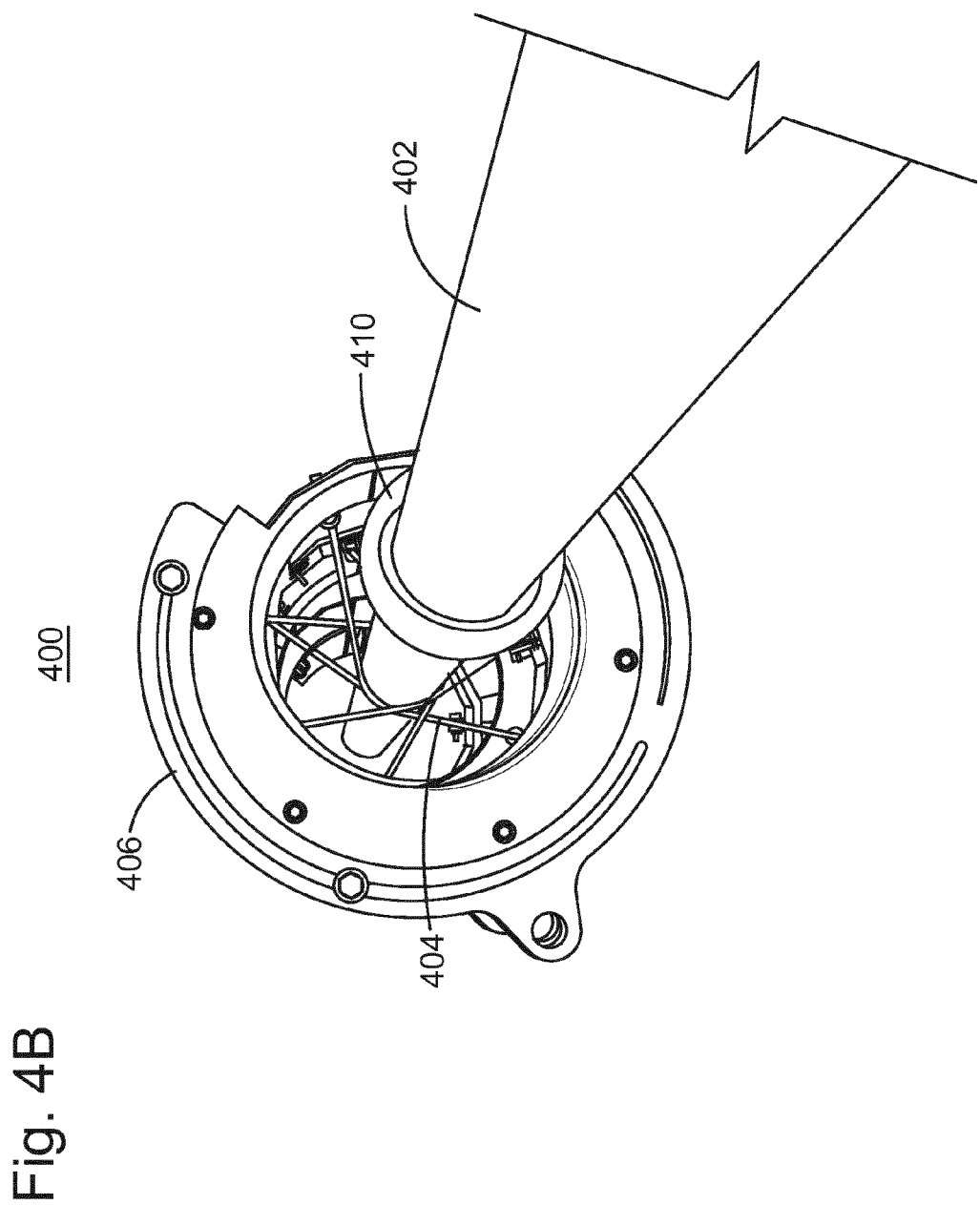
FIG. 4B illustrates a front sectional view of cleaning device with soft element according to an embodiment.

According to an embodiment illustrated in FIG. 3, a cleaning device 300 is deployed around a streamer 302, located or not in a body of water, and soft element 304, e.g., fibrous material, ropes, strings, fibers, etc., is used to clean marine fouling from the streamer. Soft element 304 is adjustable so that when it comes in contact with streamer 302, it becomes taut. FIG. 3 shows soft element 304A and 304B which are rolled around the streamer one or more times so that marine fouling material is removed. Soft element 304 is attached to a housing 306 of the cleaning device 300. In one embodiment, the soft element 304 is attached to the housing 306 using springs between at least one end of the soft element 304 and the housing 306. In another embodiment, part 310 of the soft element 304 is kept parallel relative to the housing 306 with e.g., springs, clamps 312, hooks, rails, etc., before making contact with the streamer 302, as illustrated in FIG. 3. FIG. 4A illustrates housing 306 having plural soft elements 304, one of which 304A is shown having a spring 312 attached to one of its ends 304A-1. Note that soft element 304A extends then to a pulley type element (i.e., a pulley or simply a hook) 314, enters through a hole 316 inside housing 306 and then extends to another hook 318 and the other end 304A-2 of the soft element is finally connected to a clamp 320 inside housing 306. Those skilled in the art would appreciate that more or less pulley type elements may be located inside the housing for any given soft element 304. Although a single stage of soft element 304 is illustrated in FIG. 3, more stages may be used, if desired, and their location relative to the housing 306 may be chosen depending on the application. For example, in one embodiment, the soft elements 304 can be attached to the ends of the housing 306. The number of soft element 304 in each stage may be more or fewer depending on the application and their configuration modified for the desired application. In one embodiment, the soft element 304 completely turns around the exterior of the streamer 302. In another embodiment, none of the individual soft element 304 fully wraps around the streamer, but the soft element 304A and 304B collectively fully wrap around the streamer. FIG. 4B illustrates a cross-sectional view of cleaning device 400 with streamer 402 being cleaned by soft element 404 located in housing 406. Note that an obstacle 410 attached to streamer 402 and having a larger exterior diameter than the streamer can easily pass through the cleaning device because soft element 304's elastic properties. Also note that in one application, both ends of the soft element are attached to an inside of housing 406.

Figure 5:
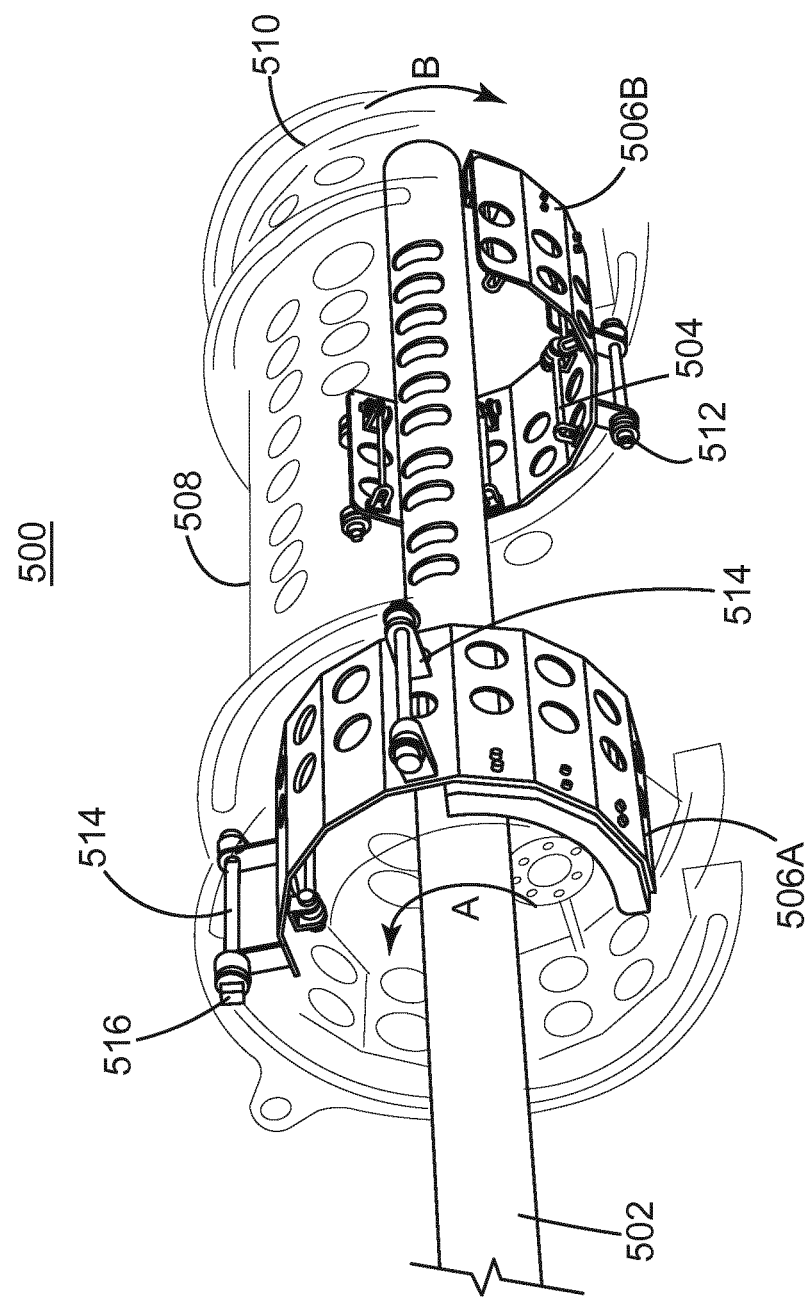
FIG. 5 illustrates a cleaning device with soft element and contra-turning ends according to an embodiment.

According to another embodiment illustrated in FIG. 5, a cleaning device 500 is positioned over the streamer 502. Soft element 504 (only part of it is shown in the figure) is connected to contra-turning ends 506A and 506B which are configured to turn in opposite directions about the streamer 502, as illustrated by arrows A and B. By this action, turning ends 506A and 506B tauten soft element 504 to adjust fit around streamer 502 to clean marine fouling. The contra-turning ends 506A and 506B slide in corresponding rails or along some tracks 510 and ball-bearings 512 may be used to allow ends 506A and 506B to rotate relative to the tracks. Soft element 504 is contained within a housing 508 of the cleaning device 500. In one application, only a single turning end is provided for changing a stress induced in the soft element. One or more handles 514 may be attached to the turning end for facilitating the turning. In another application, a stop mechanism 516 is connected to handle 514 for fixing it in place relative to track 510. For example, stop mechanism 516 may include a nut and washer that attach to an end of handle 514, which end is configured as a screw. Other stop mechanisms may be conceived by those skilled in the art that will achieve the same functionality.

Figure 6:
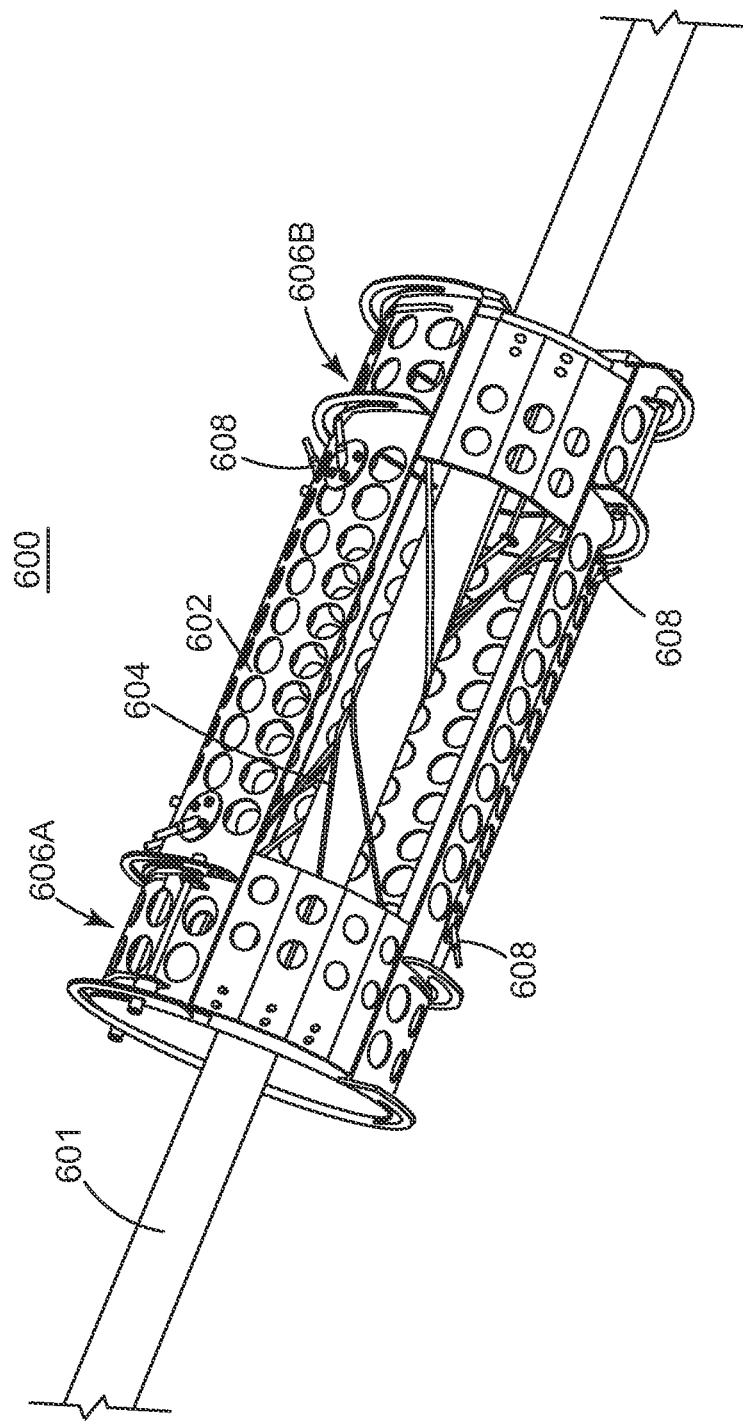
FIG. 6 illustrates a cleaning device with contra-turning ends and high pressure nozzles according to an embodiment.

According to another embodiment illustrated in FIG. 6, a cleaning device 600 is deployed around a streamer 601. Soft element 604, contained within housing 602, is connected to at least one of contra-turning ends 606A and 606B which are configured to turn in opposite directions about the streamer 601 in order to tauten soft element 604 to adjust fit around streamer 601 to clean marine fouling. High pressure nozzles 608 are located on the housing and configured to eject a pressurized fluid (e.g., water) in opposite directions to be able to clean around hidden corners (e.g., weights, connections, etc.) of streamer 601. The high pressure nozzles 608 may be oriented at a 45° angle. However, the high pressure nozzles may be oriented at other angles between 1 and 90°.

Figure 7:
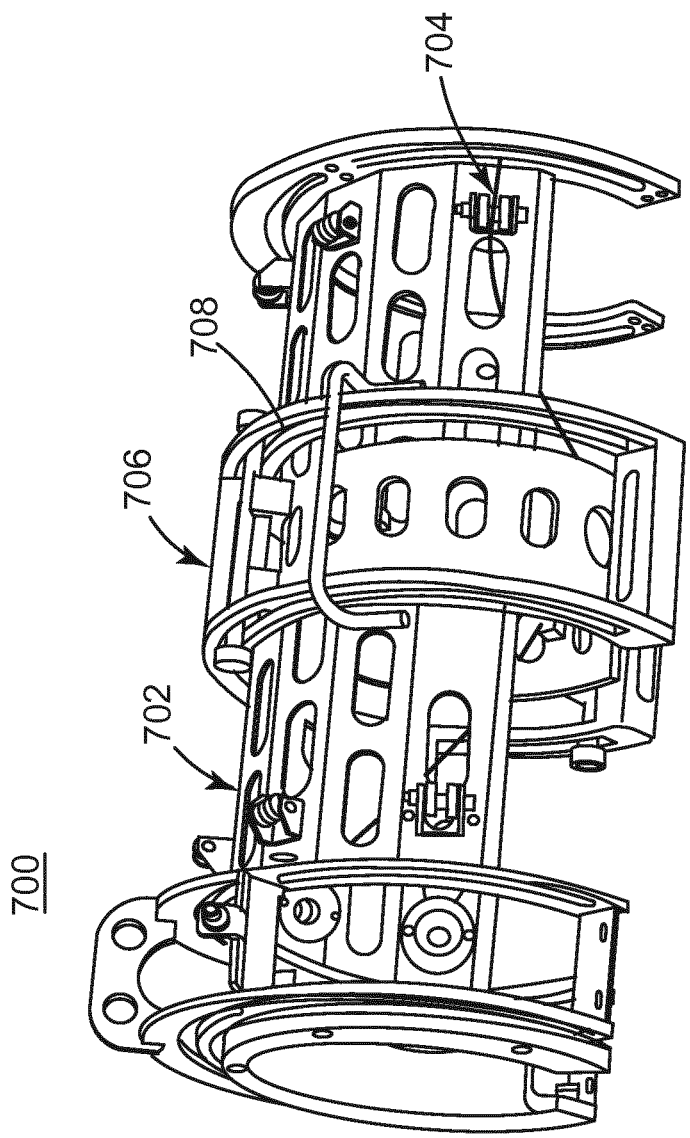
FIG. 7 illustrates a cleaning device with soft element and central turning element according to an embodiment.

According to another embodiment illustrated in FIG. 7, a cleaning device 700 is fitted over a streamer. Soft element 704 is connected to a central turning element 706 which tautens or loosens soft element 704 to adjust fit around a streamer to clean marine fouling. Soft element 704 is contained within a housing 702 of the cleaning device 700 and attached to the central turning element 706. The central turning element 706 slides in corresponding rails or along some tracks 708 and it may use ball-bearings for rotation.

Figure 8:
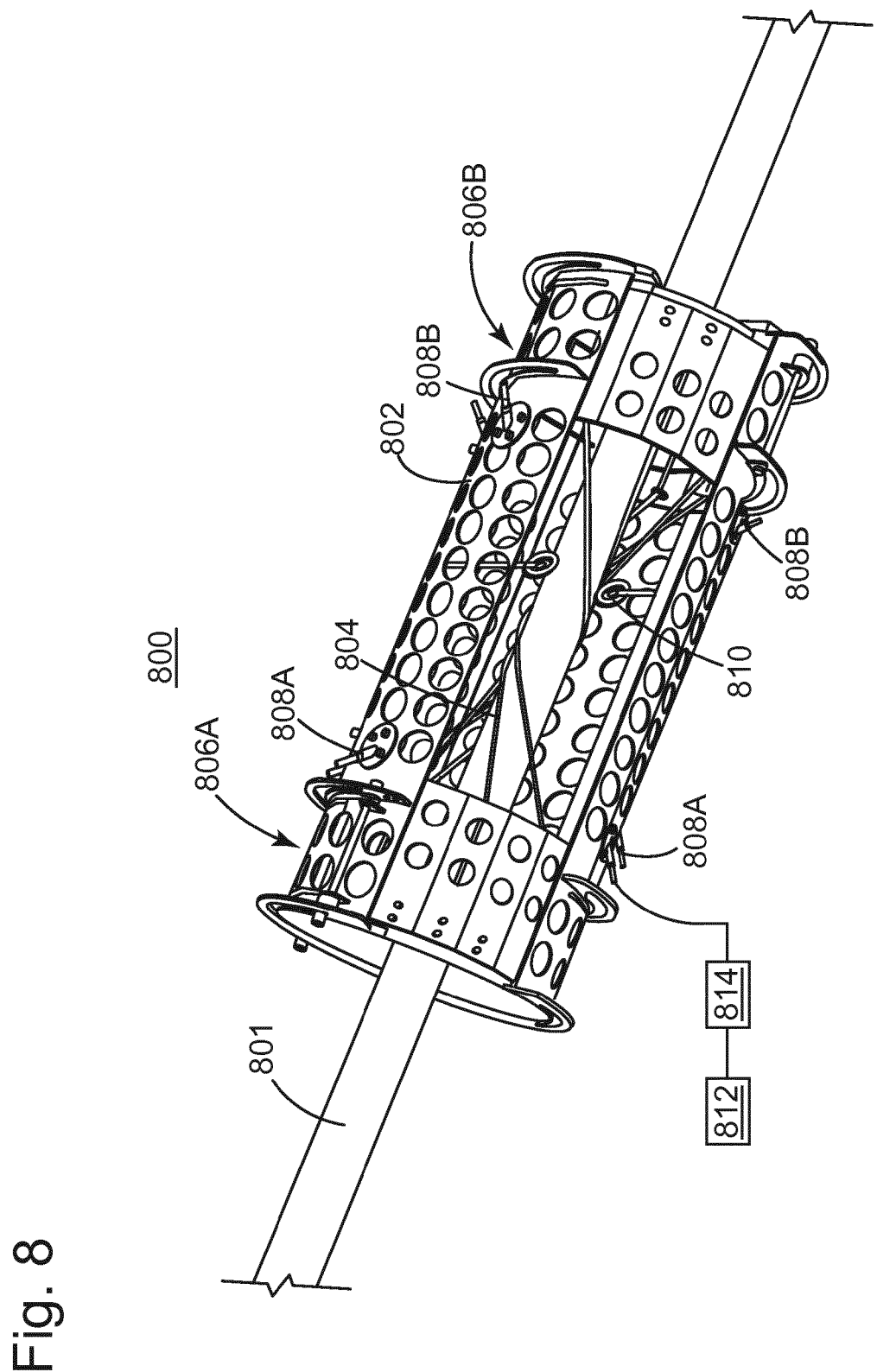
FIG. 8 illustrates a cleaning device with soft element and contra turning ends and high pressure nozzles.

According to another embodiment illustrated in FIG. 8, a cleaning device 800 has contra-turning ends 806A and 806B to tauten or loosen soft element 804. Guiding elements 810 (e.g., wheels, rings, etc.) guide and keep streamer 801 oriented relative to housing 802. High pressure nozzles 808A and 808B are located on the housing and configured to eject a pressurized fluid (e.g., water) in opposite directions to be able to clean around hidden corners (e.g., weights, connections, etc.) of streamer 801. A hydraulic motor 812 is connected to a hydraulic pump 814 to provide high pressure to high pressure nozzles 808A and 808 B. The hydraulic motor 812 and the hydraulic pump 814 may be located, for example, on the workboat. Although multiple high pressure nozzles 808A and 808B are illustrated, above and below streamer 801, the location of the high pressure nozzles 808A and 808B need not be restricted to the ends of cleaning device 800 and may be positioned anywhere along the housing 802 and in as many stages as desired and in as many pairs as needed. The location of high pressure nozzles 808A and 808B need not be limited to above or below the streamer 801, as illustrated, and the configuration can be changed according to the desired application. Guiding elements 810 may be located at various points and in various stages throughout cleaning device 800 according to the desired application.

Figure 9:
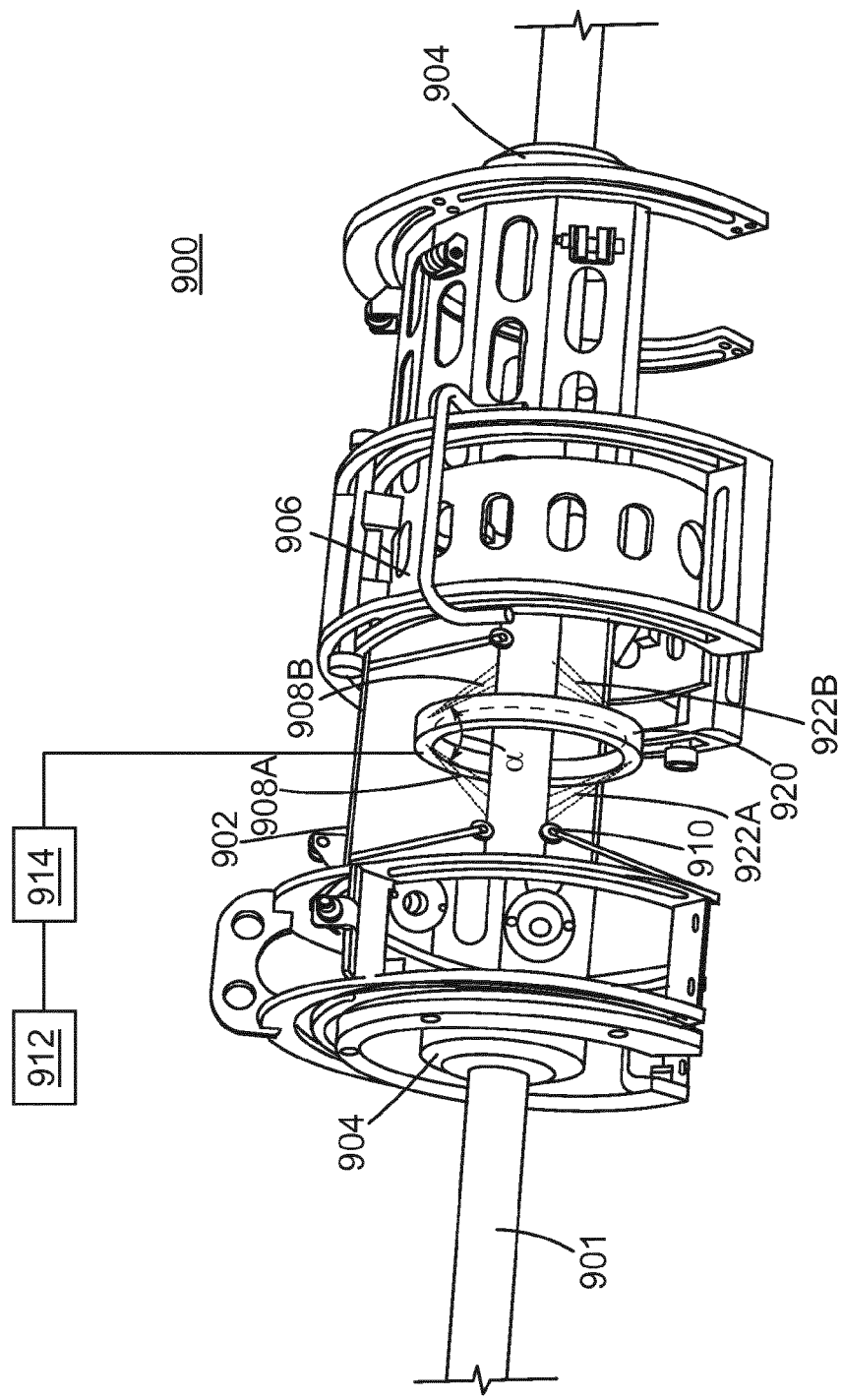
FIG. 9 illustrates a cleaning device with soft element and central turning element and high pressure nozzles according to an embodiment.

According to another embodiment illustrated in FIG. 9, a cleaning device 900 has a central turning element 906 to tauten or loosen soft element 904 contained within housing 902. Guiding elements 910 guide and keep streamer 901 oriented relative to high pressure nozzles 908A and 908B which are configured in opposite directions to be able to clean around hidden corners (e.g., weights, connections, etc.) of streamer 901. A hydraulic motor 912 is connected to a hydraulic pump 914 to provide high pressure to high pressure nozzles 908A and 908 B. In one embodiment, high pressure nozzles 908A and 908B are distributed on a bar 920 contained within the housing 902 and surrounding streamer 901. One or more bars may be positioned within the housing. The high pressure nozzles may be oriented so that the water jets 922A and 922B make a predetermined angle α. In one application, angle α is about 90°.

Figure 10:
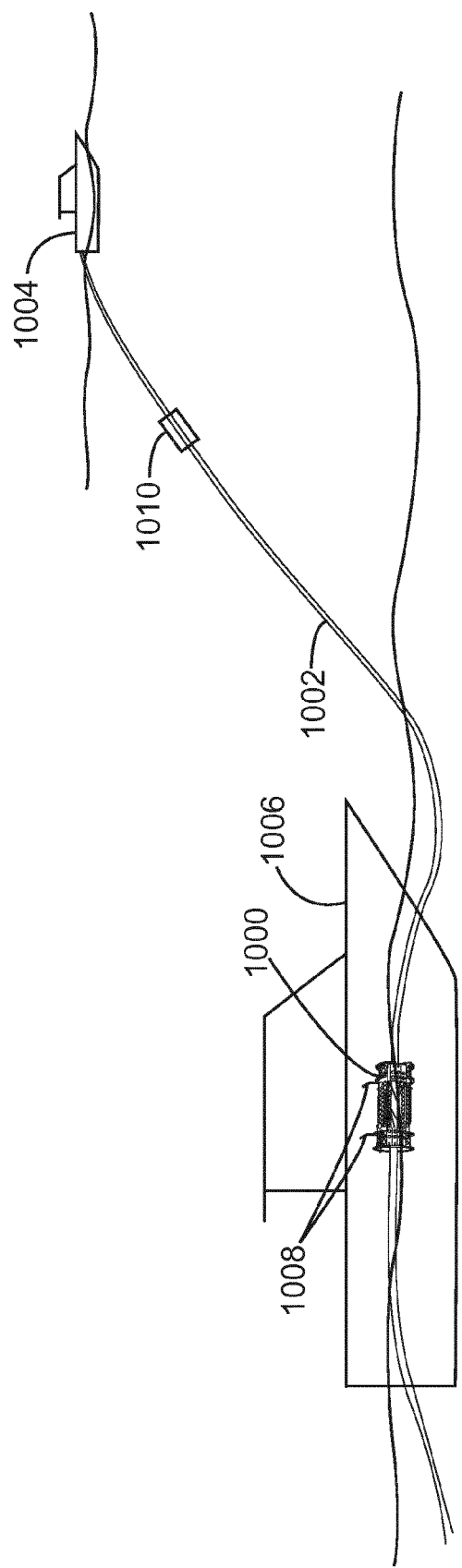
FIG. 10 illustrates how a cleaning device operates with a work boat and a vessel according to an embodiment.

According to an embodiment illustrated in FIG. 10, a vessel 1004 tows a streamer 1002. A cleaning device 1000 is attached to a workboat 1006 via a connector 1008 (e.g., straps, railing, crane, etc.). Workboat 1006 communicates with vessel 1004 to raise one or more sections of streamer 1002 out of the water using position control devices 1010 (e.g., birds). Workboat 1006 then connects cleaning device 1000 to streamer 1002 and moves parallel to streamer to allow cleaning device 1000 to remove marine fouling. Cleaning device 1000 may be attached anywhere along workboat 1006 via connector 1008 that would allow for cleaning of streamer 1002. Cleaning device 1000 may be any one described above.

Figure 11:
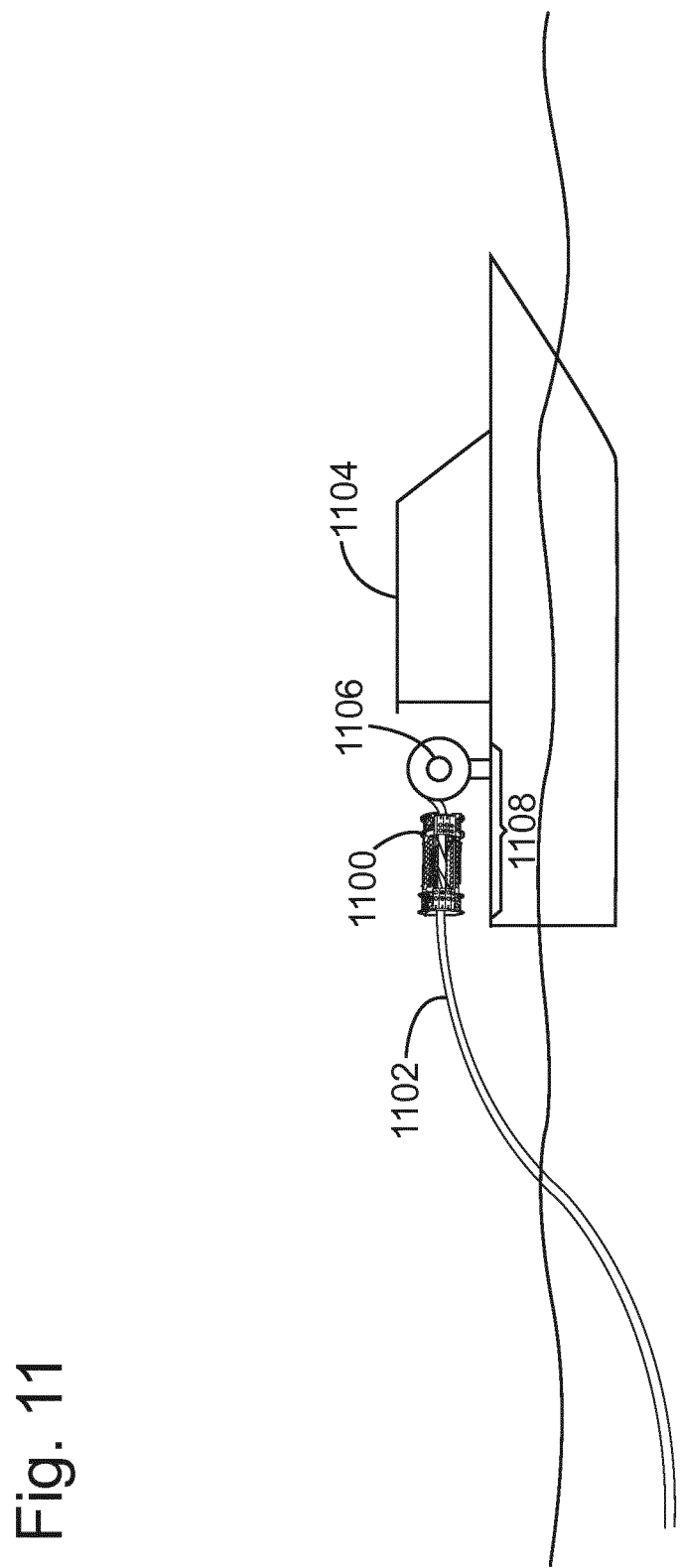
FIG. 11 illustrates how a cleaning device operates on a vessel according to an embodiment.

According to an embodiment illustrated in FIG. 11, a cleaning device 1100 is located on the back deck 1108 of a vessel 1104. During the recovery process of streamer 1102, the cleaning device 1100 is positioned around streamer to clean it of marine fouling as it is stored in storage device 1106 (e.g., spool, container, etc.).

Figure 12:
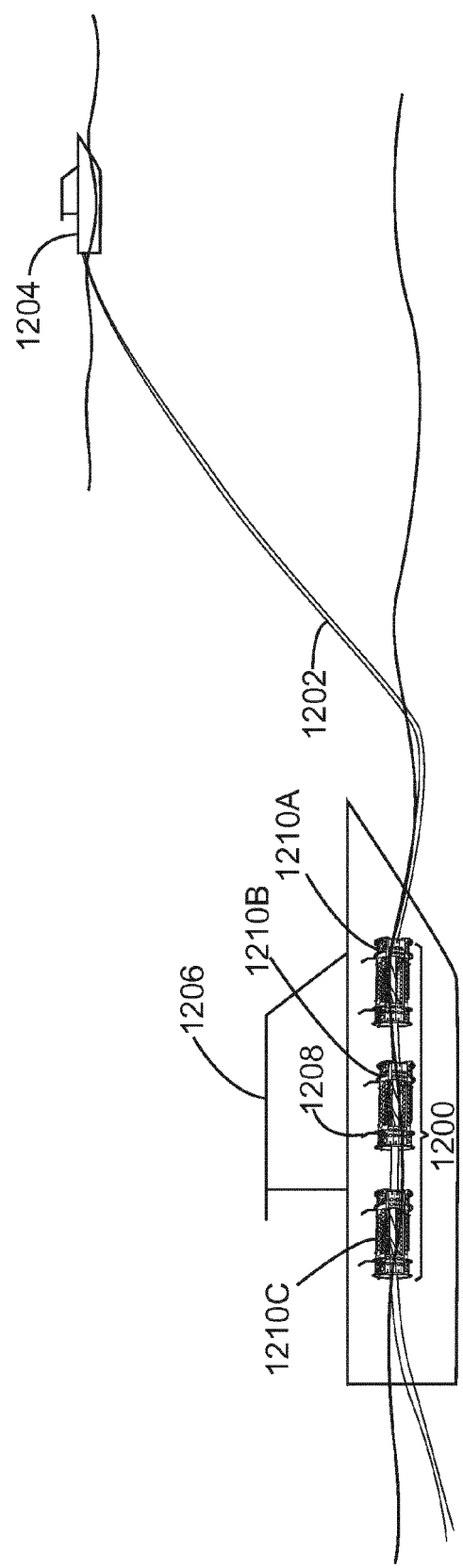
FIG. 12 illustrates a cleaning device with multiple stages according to an embodiment.

According to an embodiment illustrated in FIG. 12, a vessel 1204 tows a streamer 1202. A workboat 1206 has attached a cleaning device 1200 with cleaning stages 1210A, 1210B, and 1210C via a connector 1208. One possible configuration of the cleaning stages 1210A, 1210B, and 1210C is that stage 1210A contains a soft cleaning stage. The soft cleaning stage can include, for example, one of the soft elements discussed above. In addition, the soft cleaning stage may include abrasive elements (e.g., scraper wheels, brushes, wires). Stage 1210B may contain a high pressure and/or ultrasound cleaning causing cavitation with sufficient power to overcome the particle-to-substrate adhesion forces, loosening contaminants, and stage 1210C may contain an application of an antifouling wax to prevent future growth. Application of the antifouling wax may be selected according to which barnacle species would be most affected by the antifouling wax. Cleaning device 1200's cleaning stages 1210A, 1210B, and 1210C need not necessarily be located in 3 separate housings, as illustrated in FIG. 12, but are shown in this configuration to illustrate one possible configuration. The order of the stages 1210A, 1210B, and 1210C may also be changed.

According to an embodiment illustrated in FIG. 13, there is a method for cleaning a streamer. The method includes a step 1300 during which a workboat communicates with a towing vessel to partially raise streamer, a step 1302 of workboat making visual confirmation of streamer, a step 1304 of workboat lifting a section of streamer, a step 1306 of workboat clamping on the raised portion of the streamer the cleaning device, a step 1308 of workboat driving from the tail to the head of streamer section while actuating the cleaning device, and a step 1310 of workboat unclamping and re-clamping of cleaning device for passing small obstacles (e.g., birds).

The disclosed embodiments provide an apparatus and a method for removing marine growth on marine seismic streamers. It should be understood that this description is not intended to limit the invention. On the contrary, the embodiments are intended to cover alternatives, modifications and equivalents, which are included in the spirit and scope of the invention as defined by the appended claims. Further, in the detailed description of the embodiments, numerous specific details are set forth in order to provide a comprehensive understanding of the claimed invention. However, one skilled in the art would understand that various embodiments may be practiced without such specific details.

Although the features and elements of the present embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims. No element, act, or instruction used in the description of the present application should be construed as critical or essential to the invention unless explicitly described as such. Also, as used herein, the article "a" is intended to include one or more items.

What is claimed is:

1. A cable cleaning device comprising:
   a housing;
   at least one cleaning element attached to the housing and configured to clean marine fouling from a cable; and
   a movable part connected to the cleaning element and configured to rotate relative to the housing;
   wherein the cleaning element is at least partially rolled around the cable and a tautness of the cleaning element is adjustable by rotating the movable part relative to the housing, and
   wherein the cleaning element is a rope attached with both ends to the housing, and the rope has elastic properties allowing a portion of the cable with a larger diameter to pass through the housing and be cleaned.

2. The cleaning device of claim 1, wherein the rope is made of a soft fibrous material and it is attached with a spring element to the housing.

3. The cleaning device of claim 1, wherein the movable part comprises:
   a turning end connected to the cleaning element and configured to turn relative to the housing to adjust the tautness of the cleaning element.

4. The cleaning device of claim 3, wherein the turning end comprises:
   contra-turning ends configured to turn in opposite directions relative to the housing along corresponding tracks.

5. The cleaning device of claim 1, wherein the turning element is a central turning element configured to tauten the cleaning element when rotated.

6. The cleaning device of claim 1, wherein the housing contains at least one of a soft cleaning stage including the cleaning element, a high pressure cleaning stage and an antifouling wax stage.

7. The cleaning device of claim 1, wherein a first end of the rope is attached with a spring to the housing.

8. The cleaning device of claim 7, wherein a second end of the rope is attached with a clamp to the housing.

9. The cleaning device of claim 7, wherein the rope extends over a pulley, which is attached to the housing.

10. The cleaning device of claim 9, wherein the rope further extends over a hook, which is attached to the housing.

11. The cleaning device of claim 1, wherein the rope completely wraps around an exterior of the cable.

12. The cleaning device of claim 1, wherein the cable is a marine streamer.

13. The cleaning device of claim 1, wherein both ends of the rope are attached to an inside of the housing.

* * * * *